(12) United States Patent
Lin et al.

(10) Patent No.: US 6,757,070 B1
(45) Date of Patent: Jun. 29, 2004

(54) UNIVERSAL PRINT DRIVER

(75) Inventors: Shane Lin, El Segundo, CA (US); Fred Schempp, Webster, NY (US); Edward Ho, Taipei Hsien (TW)

(73) Assignee: Advanced HiTech Corporation, El Segundo, CA (US)

( * ) Notice: Subject to any disclaimer, the term of this patent is extended or adjusted under 35 U.S.C. 154(b) by 228 days.

(21) Appl. No.: 09/934,111

(22) Filed: Aug. 21, 2001

(51) Int. Cl.[7] .............................................. G06F 15/00
(52) U.S. Cl. ........................ 358/1.1; 358/1.15; 358/1.16
(58) Field of Search ..................... 358/1.1, 1.6, 1.12, 358/1.15, 1.16; 715/527

(56) References Cited

U.S. PATENT DOCUMENTS

2002/0046238 A1 * 4/2002 Estavillo .................... 709/203
2002/0051194 A1 * 5/2002 Sakura ....................... 358/1.15

FOREIGN PATENT DOCUMENTS

JP        2002287913    * 10/2002    ............. G06F/3/12

* cited by examiner

Primary Examiner—Jerome Grant, II
(74) Attorney, Agent, or Firm—Reed Smith, LLP

(57) ABSTRACT

A Universal Print Driver prints to a variety of output devices at the server in a client/server printing environment. The output devices include virtually any computer operated device including all types of printers. The server is either a print server or a web server. When printing using this print driver, web pages are provided by the server and displayed on the client by a browser invoked by the Universal Print Driver. The web pages allow users at the client to select output devices and specify the job submission parameters for the selected device. Application files are printed in electronic format in the output devices through the cooperation of the print driver and the server. Server-provided web pages reflect the output devices installed on the server and permit control and selection of these devices without specific print drivers being installed on the client computers.

15 Claims, 8 Drawing Sheets

UNIVERSAL PRINT DRIVER

BACKGROUND OF THE INVENTION

1. Area of the Art

The present invention concerns the area of networked computer output and more specifically a universal print driver to obviate the need to install each printer specific driver on each and every client computer in such a network.

2. Background

Printing to a local printer in a computer system is a complicated process. It is more involved in a client/server environment where print jobs from client computers traverse a network to a server computer and thence to a printer for output. Particularly in a network a "printer" can be any type of hard copy output device including plotters and film printers. Printing files to a new printer is not easy for an average computer user because it is necessary to install a print driver for every new printer. A "driver" is a specialized piece of software that interfaces between the computer and hardware. Since each new printer has new features, it usually requires a new driver program so that the hardware features can be properly utilized.

When printing an application file to a local printer in the traditional way, the user first has to select a printer. Then the user specifies the job submission parameters (such as number of copies, paper size, etc.). Actually the selection of a "printer" invokes the driver software for controlling the desired printer. When the user selects the parameters and hits the OK button, the driver converts the application file to a stream of PCL® (trademark of Hewlett Packard Corporation) or Postscript® (trademark of Adobe Corporation) or similar commands. A second software program (a print command interpreter) interprets PCL or Postscript commands and converts them to print ready image data (this action is called "ripping" or "RIP"). The image data is usually compressed before transmission to the printer (to save transmission time) and then decompressed at the printer for printing. In some cases the print command interpreter resides in the printer so that PCL or Postscript code is transmitted rather than image data. In either case, the local print driver must be matched to the printer so that the correct image data or printer code is generated and transmitted.

For printing in a client/server environment (network printing) in the traditional way, the user at the client computer first chouses the printer (selects the print driver), and then selects the job submission parameters as in the local printing case. The ripping of the application file can be done at the client, at the server, or at the printer. In the first case, compressed file data and job control parameters are sent to the server which finds the output device for the client's printing job. In the second case, the application file and job control data are sent to the server from the client, then the file is "ripped" at the sever (the print server) and then printed on a connected printer using the job control parameters. In the third case, application file and job submission parameters are sent to the server from the client, then the file is "ripped" and printed at the selected output device.

Though the whole printing process is transparent to the user at the client, the user usually has the burden of installing a new printer driver for every new type of printer, or more generally, for any output device hooked up to the server. The output device includes, but are not limited to, printer, digital copier, facsimile unit and multi-function machine (scanner/copier/printer). This installation process is often not straightforward and requires the user's knowledge and correct answers to often complex questions during the installation process. Sometime the user has to add and remove the same driver several times to get a correct installation. In a network situation it may be possible to automate the installation of print drivers, but this takes up disk space on each client computer and provides yet another possible point for network failure should some of the installations be flawed.

With the present invention, the user avoids the headache of installing a new print driver for every new output device that is added to the server. The user has to install only a single Universal Print Driver. With this print driver, the user then has access to all other output devices on the server without installing all the other print drivers.

The installation of this innovative print driver is similar to installation of the conventional print driver except that during the installation process the user is prompted to enter the IP address of the server as opposed to complex information about the various printers. The print driver is invoked in a manner similar to a conventional print driver, but a web page is automatically displayed and provides output device configuration and job control parameters for the user to select. The inventive print driver consists of three components: a basic print driver for the general job control parameters (such as number of copies), an installer/uninstaller, and a browser launch program.

SUMMARY OF THE INVENTION

This invention is a print driver that essentially avoids the need to install the plethora of other print drivers on the client computer if this inventive print driver is installed in a client/server environment with a "cooperating" server.

When running this print driver, a web browser will automatically pop up, allowing the user to select a specific output device (attached to the cooperating server) and configure that output device as desired to print. The user can specify the job submission parameters (items such as number of copies, source or type of paper, two-sided printing, paper size, image orientation, job priority and job scheduling) including advanced options like finishing options (items such as stapling, sorting, binding and folding), image quality options (items such as image resolution, toner usage or density, image color, image contrast, and image brightness), etc. from the web browser. The presented options automatically match the facilities of the selected printer. Of course, any options germane to a particular printer (output device) can appear for user specification. Output devices include various types of plotters, screen printers and film printers with appropriate choices of user selectable features.

This invention essentially uncouples job submission parameters from the conventional print driver in the client computer. Instead, the individual print drivers that actually control these job submission parameters are installed only on the server computer and communicate with the client computer through a web browser interface, The user is relieved of the burden of installing a multiplicity of print drivers in the conventional way and yet can still reap the full benefits of all printers installed in the network.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a universal print driver for use in a client/server printing system to obviate the need to install a plurality of print drivers on the client computers.

Figure 1:
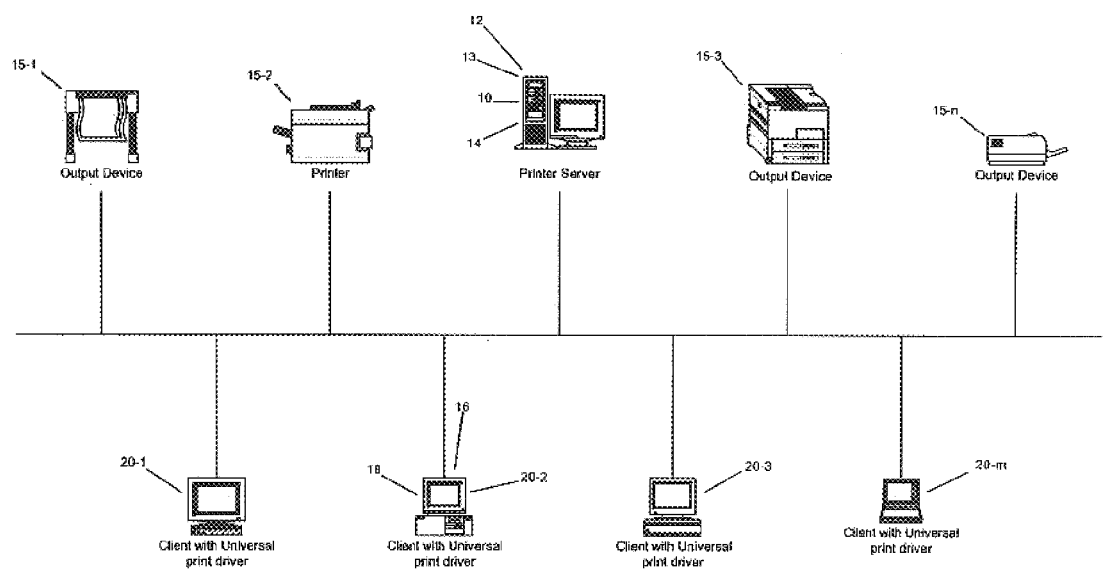
FIG. 1 shows a network diagram of a client/server printing system.

FIG. 1 shows a client/server printing system. The system 10 comprises a server 12, a plurality of output devices (including specifically printers) 15-1, 15-2, . . . 15-n, and various client computers 20-1, 20-2, . . . , 20-m. A user prints from any client computers 20-1, . . . , 20-m and can print to any of output devices 15-1, . . . , 15-n via the server 12. A server software process 13 runs on the server to provide coordination between print jobs submitted by the client computers 20 and the output devices 15. The server 12 may also run a ripping process 14 (see FIG. 2 and FIG. 4 for more details).

Figure 3:
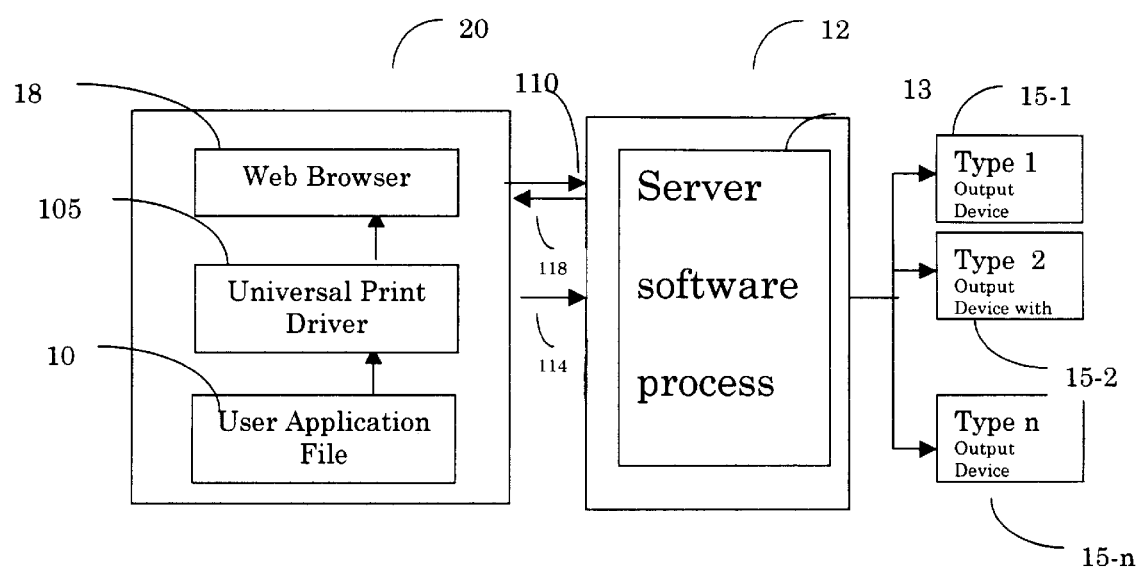
FIG. 3 is a schematic diagram showing how Universal Print Driver interacts with a Web Server to print.

When a user prints an application file, a print driver 16 is invoked. This can be a print driver corresponding to any of printers 20-1, 20-2, . . . 20-m in a prior art system. In that case, the user needs to install up to m print drivers (as depicted in FIG. 3). In the prior art system whenever a print driver is invoked at print time, a user interface window appears to accept input of printing parameters. The window is generated showing printer/print driver specific items, and user input to the window communicates the input parameters to the print driver for control and modification of the print data and hence the ultimate printed product.

Figure 2:
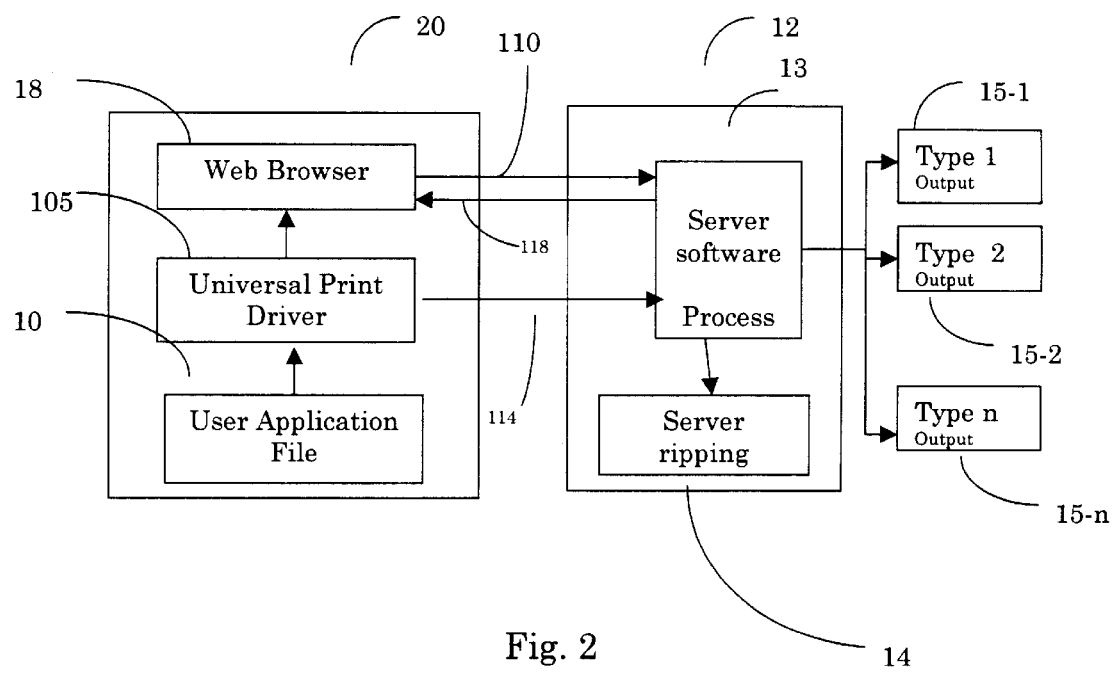
FIG. 2 is a schematic diagram showing how the inventive Universal Print Driver interacts with a Print Server to print.

The installed print driver can also be the inventive Universal Print Driver, in which case, the user needs to install only a single driver (as depicted in FIG. 2) no matter how many actual physical printers are present on the system. When the Universal Print Driver is installed in a client computer 20 as a print driver item 16, a web browser window 18 will automatically appear whenever the driver item 16 is invoked at print time. The web browser window 18 provides the user with print parameters to set for submission of the print job. The browser window 18 first displays a list of printers installed on the system to allow the user to select a preferred printer. Unlike the prior art system, this information does not come from the print driver. Rather html data are sent by the server to display the list. After a printer is selected, an addition window(s) is displayed to allow the user to select printing parameters germane to the selected printer. Again, the printer specific information is sent in html by the server. When the user selects printing parameters, the selection is sent to the server for configuration of the "normal" print drivers installed on the server 12. After this, the print data are sent to server 12, which converts application file to image data (ripping) using process 14, and then, with the help of server process 13, redirects the image data to any of output devices 20-1, . . . , 20-n as the user specified through the browser window 18. The server can be either a print server which does the ripping in the server (as just explained), or it can be a server which redirects the application file to the output device where the ripping is performed by the output device. In either case, the server provides the remote user interfaces for configuring the output devices and specifying job submission parameters.

It is contemplated that the Universal Print Driver invokes an ordinary web browser since such software is actually part of many operating systems. However, it is also possible to provide a dedicated "browser" solely for rendering user interface windows from printer specific information provided by the server process 13. Similarly, it is preferred to use html (or related hypertext language) for transferring information back and forth. However, it is within the scope of the present invention to use any available coding means to transfer the information from the server to the client and vice versa.

It should be appreciated that this arrangement allows the ready use of ordinary application programs and ordinary print drivers. To the operating system the Universal Print Driver looks like an ordinary print driver. When the user selects a printer, the web page interplay discussed above allows the actual selection of a remote printer. This selection process allows the Universal Print Driver to display various parameters of the selected printer to the operating system. In this way the operating system can convey these parameters to the application programs so that WYSIWYG ("what you see is what you get") pages display properly on the computer screen. The application program happily sends the application file to the Universal Printer without ever "knowing" that it is not interfacing with an "ordinary" print driver. At the server each new "ordinary" print driver is installed in the usual manner. However, the installation process preferably also transfers the key printer data into the server process 13 (or a related process) to provide the information needed for the html sent to the client browser window. Similarly, the server process 13 receives the html user print parameter input from the client and transfers it to the "ordinary" print driver. Alternatively or supplementally, data files associated with the server process 13 can be manually edited to change or provide the specific printer information needed for the printer configuration process.

FIG. 2. shows a schematic of how the Universal Print Driver works with the print server process 13 to print out the user's application file. At client computer 20, a user wants to print a user application file 108 to one of the output devices 15-1, 15-2, . . . , 15-n, which are attached to the server computer 120. All these output devices are of different kinds or from different vendors. Instead of the prior art requirement to install beforehand the print drivers for 15-1, . . . 15-n, the user simply has one print driver, the Universal Print Driver 105 pre-installed. At print time, the user invokes print driver 105, which brings up a web browser window 18 showing printer selections/configurations and job submission parameters for selection by the user. The application file, printer selection, and job submission parameters all from client computer 20 are now sent to server computer 12 for processing. To be more specific, application file 108 is sent by the Universal Print driver 105 as data item 114 directly to the server process 13. The printer selection together with job submission parameters are sent from web browser window 18 as data item 110 to the server process 13. The server process 13 will send updated job data and printer status data as data item 118 to the web browser window 18 at the client computer 20.

The server process 13 sends the application file to server RIP module 14 to convert it to a print ready image file and then sends the image file to one of printers 15-1, . . . , 15-n as specified by the printer selection made by the user in the web browser window 18. The printer selected then prints the image file using the job submission parameters specified from web browser window 18 as instructions on how to print. Examples of such instructions are finishing options like staple no staple, sort/no sort, etc.

FIG. 3. is a schematic of how the Universal Print Driver works with the web server process to print the user's application file. The data flows are basically the same as those in FIG. 2 except the ripping module 14 in FIG. 2 is replaced by ripping done in the output devices 15-1, . . . , 15-n.

Figure 4:
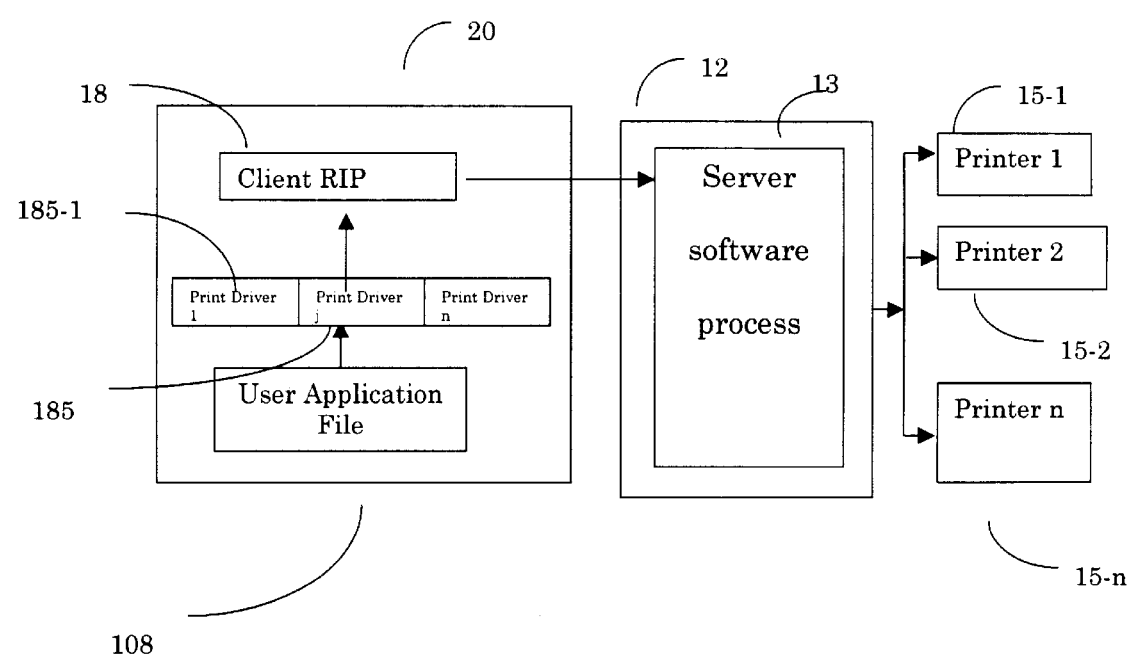
FIG. 4 is a schematic diagram showing the operation of prior art print drivers with the client computers performing the ripping function.

Two figures show the prior art process to emphasize how the inventive Universal Print Driver 105 facilitates the printing for the general users. Referring to FIG. 4., a user at client computer 20 wishes to print user application file 108 to one of printers 15-1, . . . 15-n. Up to n print drivers 185 must be installed at computer 20 (one print driver for every type of printer). If the user wants to print to printer 15-j, he/she has to invoke the corresponding print driver 185-j. The user then selects job submission parameters from the user interfaces of print driver 185-j, which forwards the processed file to RIP module 182. The print-ready data output by RIP module 182 and the job submission parameters specified at 185-j are sent to server computer 12, where the server process 13 directs them to selected printer 15-j. The overhead to the user prior to printing time is the installation of n Print Drivers 185-1, . . . 185-j, . . . , 185-n, all of which consume disk space of client computer 20 and take significant time for the user to install individually.

Figure 5:
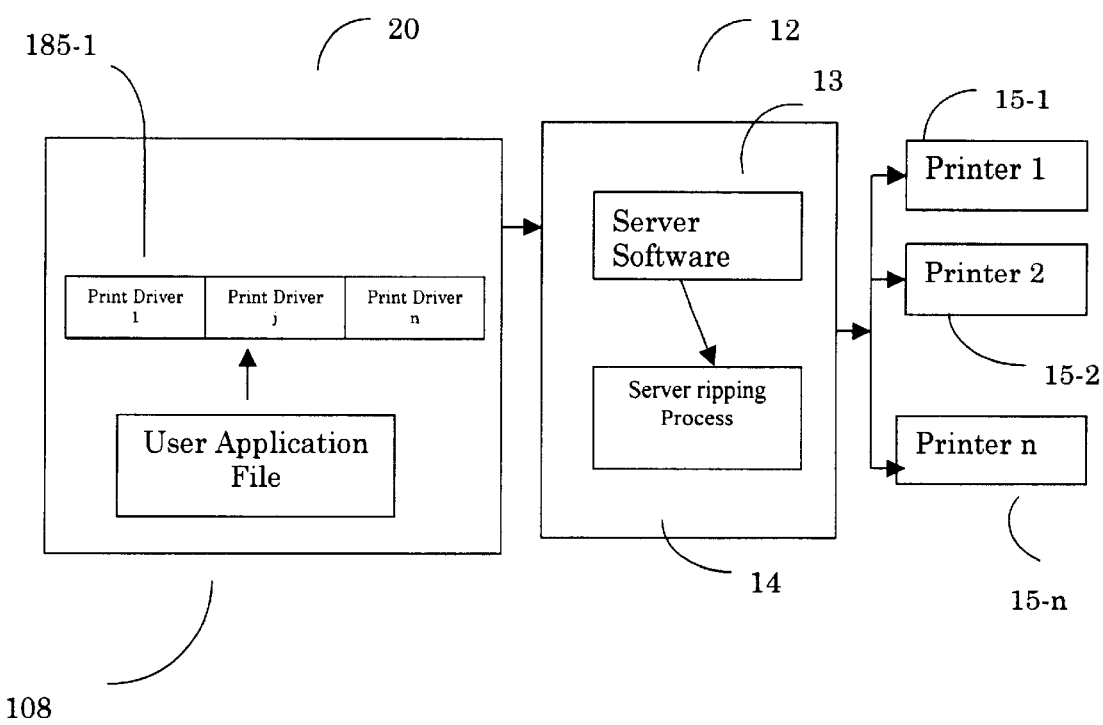
FIG. 5 is a schematic diagram showing the operation of prior art print drivers with the server performing the ripping function.

FIG. 5 is another model of the prior art manner of printing. Again print drivers 185-1, . . . , 185-n must be installed before printing. FIG. 5 is basically identical to FIG. 4 except that ripping (converting application file to a printable raster image) is done at the server computer 12 instead of the client computer 20.

Figure 6:
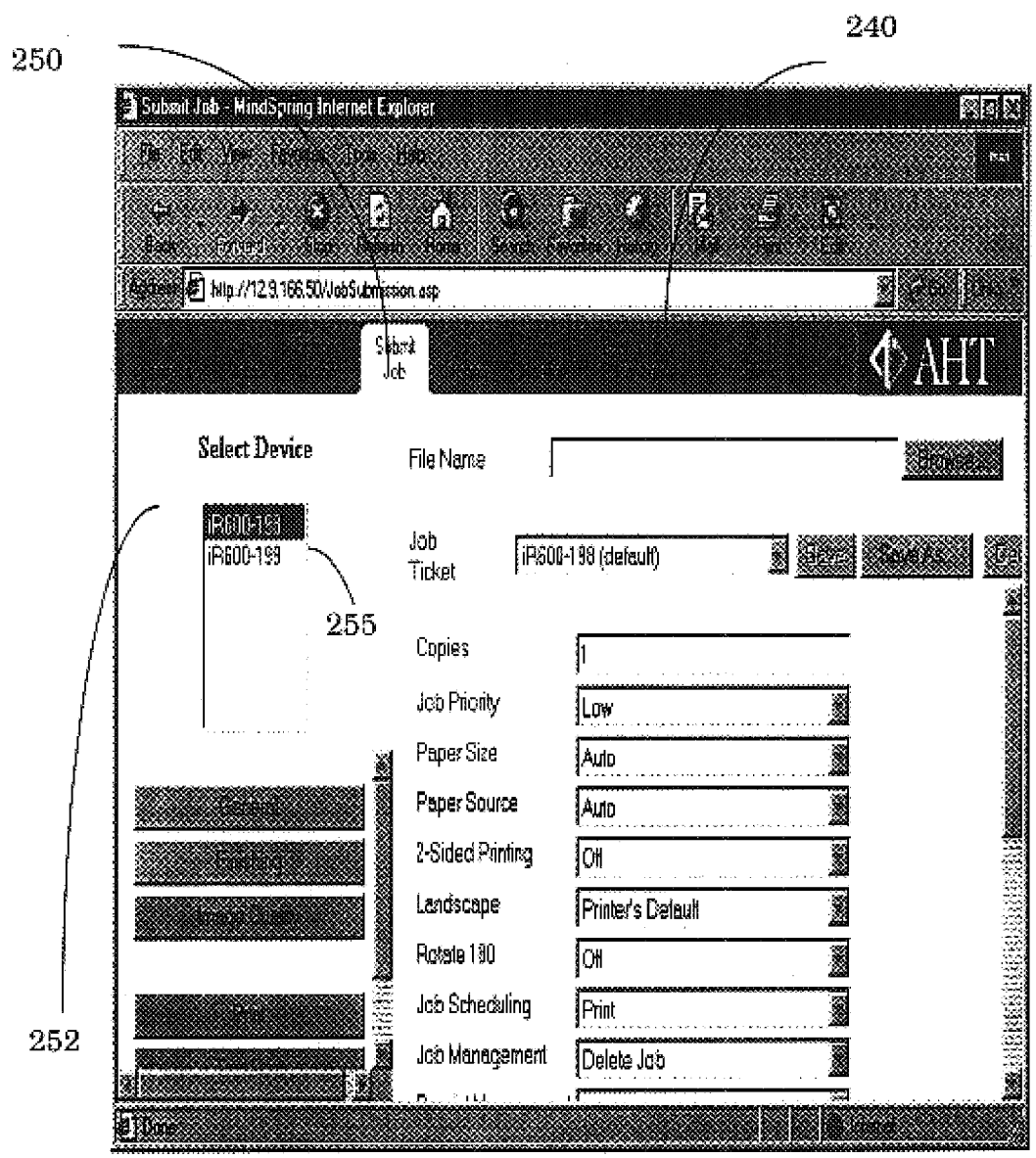
FIG. 6 is a screen display showing the web browser window invoked by the Universal Print Driver.

FIG. 6 is a screen capture of the web browser window 18 as mentioned in FIG. 2. The web browser window can display many different web pages for printing and job management. For illustration purpose, the user has already used configuration manager 240 to add two printers iR600-198 and iR600-199 to the pool of available printers. In the illustrated web page with Submit Job tab 250 specified, printer iR600-198 is highlighted and selected. The user can select from the web page job general parameters 252 such as Copies, Job Priority, Paper Size, etc. By clicking the Finishing button 255, the user can select (in another web page) the stapling options, sorting options etc.

Figure 7:
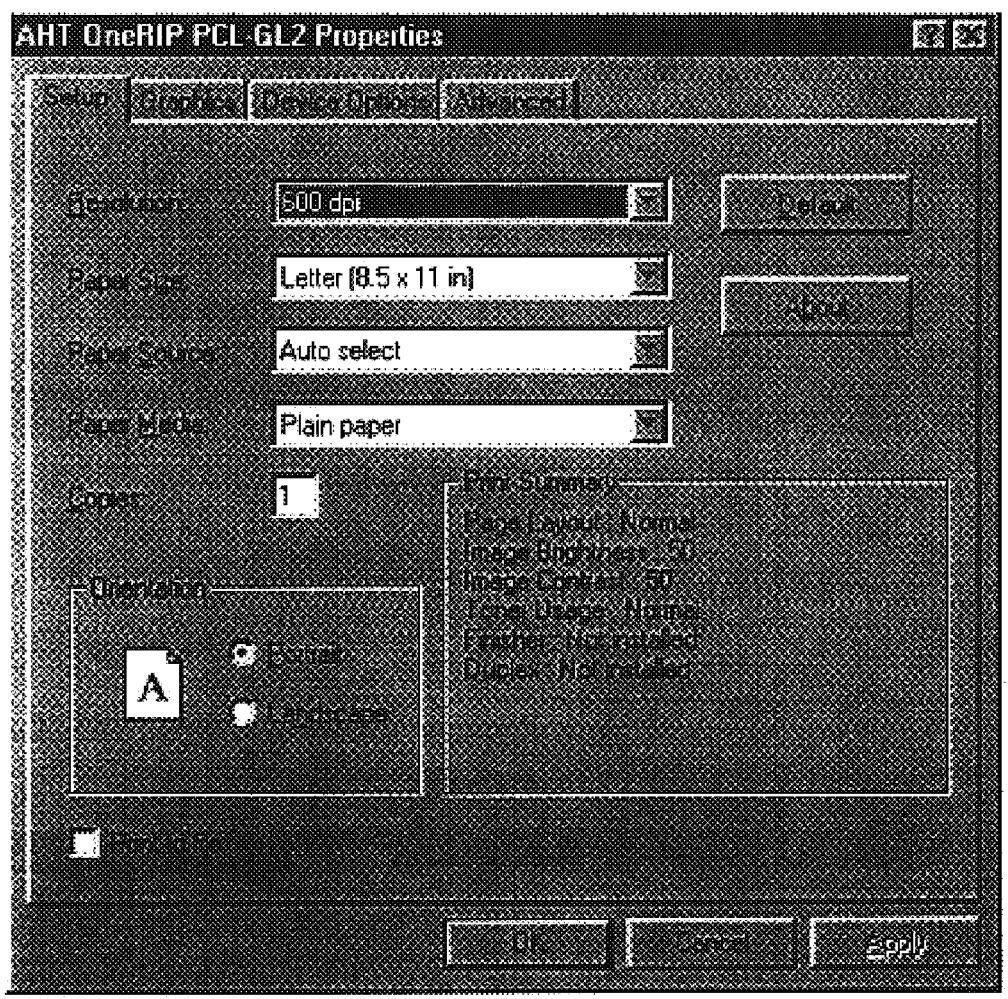
FIG. 7 is a screen display showing the user interface for selecting printing parameters as displayed in the web browser window invoked by the Universal Print Driver.

FIG. 7 is a screen capture of the inventive Universal Print Driver's direct user interface displaying some user settable general options. These options are not printer specific like finishing options (printer specific job submission options are specified at the web browser FIG. 6).

Figure 8:
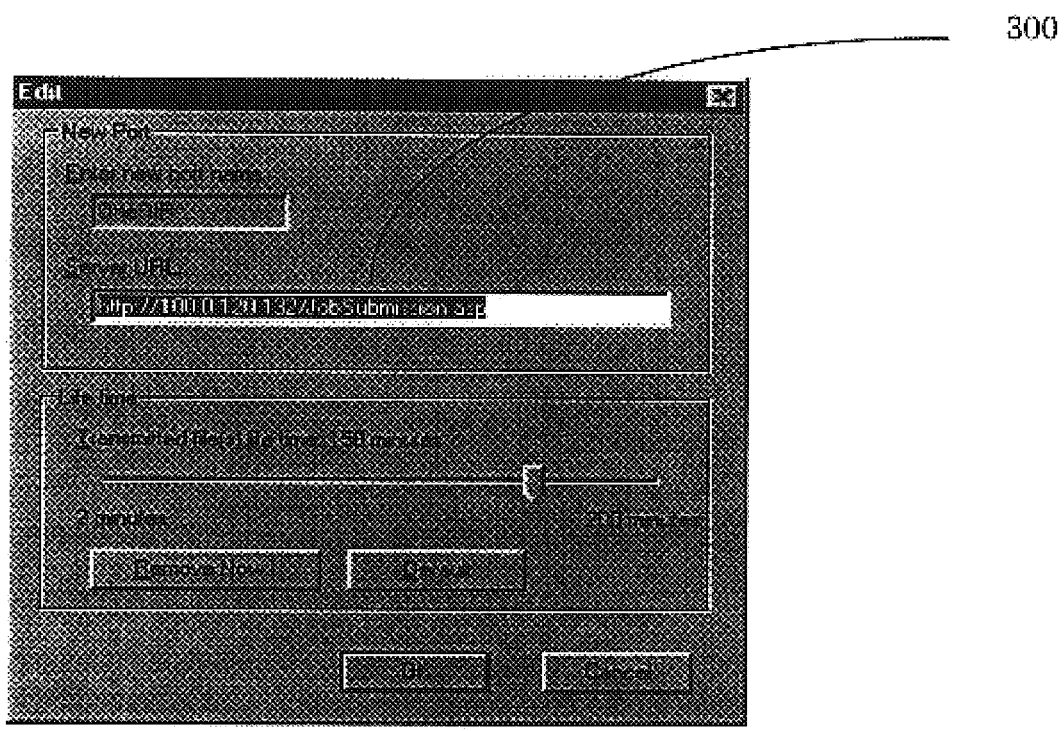
FIG. 8 shows the user interface window for setting the IP number during the Universal Print Driver installation process.

FIG. 8 is a screen capture showing the only additional action the user must perform when installing Universal Print Driver. The installation of Universal Print Driver is similar to any conventional print driver. The extra step is to specify the server computer's address (Uniform Resource Locator or IP number). With this specified at Universal Print Driver installation time, a web browser window will appear whenever one invokes the driver at print time. Here item 300 refers to the server URL entry the user has to specify during installation of the Universal Print Driver. For illustration purpose, it points to 100.0.120.132 with the "jobSubmission.asp" file specified.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. A universal print driver system for outputting files from a client computer communicating with a computer network without installing specific output drivers on the client computer, the system comprising:

a computer network;

a client computer comprising:
 means for communicating with the computer network;
 a universal print driver installed on and able to operate in the client computer; and
 browser software on the client computer activated by the universal print driver and capable of rendering and displaying data received from the computer network, receiving user input and transmitting the user input to the computer network; and a server computer comprising:
 means for communicating with the computer network;
 output devices attached to and in electronic communication with the server computer; and
 driver software specific for each output device installed on and able to operate in the server computer to output an application file on the specific output device; and a printing process operating on the server computer communicating with the browser software on the client computer by means of the computer network when the network browser is invoked by the universal print driver, wherein the printing process transmits data indicative of output devices installed on the server computer and data representing selectable output parameters of each installed output device, wherein the data transmitted by the printing process is displayed by the browser software on the client computer, wherein a user makes a selection of an output device and related output parameters from the data displayed by the browser software and the selection is transmitted to the printing process which then selects the output device and sets the related output parameters so that when an application file is printed by the client computer through the universal print driver, the application file will traverse the computer network and be processed by the driver software specific to the output device specified in the selection and output by the corresponding output device using the output parameters specified by the selection.

2. The system of claim 1, wherein the browser software is an internet browser.

3. The system of claim 1, wherein the computer network communicates via Internet.

4. A universal print driver for outputting files from a client computer to a computer network in communication with the client computer for output through the computer network comprising:

means for invoking browser software running on the client computer, said browser software capable of rendering and displaying data received from the computer network, said data indicative of printing resources communicating with the computer network, said browser receiving selections from a user and transmitting to the computer network user selections representative of choice and configuration of printing resources according to the selections; and means for transmitting designated files to the computer network for output through at least one of the printing resources communicating with the computer network, wherein the user selections control the printing resources so that the designated files are output by the at least one printing resource without driver software specific to the at least one printing resource being installed on the client computer.

5. A method for outputting files from a client computer communicating with a computer network without installing specific output drivers on the client computer, comprising the steps of:

providing a client computer including browser software attached to a computer network;

installing a universal print driver on the client computer;

outputting a file from the client computer through the universal print driver for output by an output device installed on the computer network;

activating the browser software by means of the universal print driver in response to the step of outputting;

transmitting to the client computer data representative of output devices, including their output parameters, installed on the computer network;

using the browser software to display on the client computer the data received from the computer network;

receiving and transmitting to the computer network user input responsive to the data, wherein the user input represents a selection of an output device and related output parameters from the data displayed by the network browser;

providing a printing process running on the network, which process receives the user input and sets the output device and the related output parameters accordingly so that when a file is output by the client computer with the universal print driver, the file will traverse the computer network and be processed by driver software specific to the output device specified in the user input and output by that output device according to the output parameters specified by the user input.

6. A universal print driver system for outputting files from a client computer communicating with a computer network without installing specific output drivers on the client computer, the system comprising:

a computer network;

a client computer comprising:
      means for communicating with the computer network;
      a universal print driver installed on and able to operate in the client computer; and
      browser software on the client computer activated by the universal print driver and capable of rendering and displaying data received from the computer network, receiving user input and transmitting the user input to the computer network; and a server computer comprising:
      means for communicating with the computer network;
      output devices in electronic communication with the server computer; and
      driver software specific for each output device installed on and able to operate in the server computer to output an application file on the specific output device; and a printing process operating on the server computer in communication with the browser software on the client computer by means of the computer network when the network browser is invoked by the universal print driver, wherein the printing process transmits data related to output devices installed on the server computer, wherein the data transmitted by the printing process is displayed by the browser software on the client computer, wherein a user makes a selection from the data displayed by the browser software and the selection is transmitted to the printing process which then implements the selection so that when an application file is printed by the client computer through the universal print driver, the application file will traverse the computer network and be processed by the driver software according to the selection.

7. The system of claim 6, wherein the browser software is an internet browser.

8. The system of claim 6, wherein the computer network communicates via Internet.

9. The system of claim 6, wherein the selection made by the user controls which output device outputs the application file.

10. The system of claim 6, wherein the selection made by the user controls general job submission parameters of the output device which outputs the application file.

11. The system of claim 10, wherein the general job submission parameters are selected from the group consisting of copy number, job priority, paper size, paper source, image orientation, two-sided printing and job scheduling.

12. The system of claim 6, wherein the selection made by the user controls job finishing parameters of the output device which outputs the application file.

13. The system of claim 12, wherein the job finishing parameters are selected from the group consisting of stapling options, sorting options, binding options and folding options.

14. The system of claim 6, wherein the selection made by the user controls image quality parameters of the output device which outputs the application file.

15. The system of claim 14, wherein the image quality parameters are selected from the group consisting of image resolution, toner usage, image color, image contrast and image brightness.

* * * * *